US011650917B2

(12) United States Patent
Brandt

(10) Patent No.: US 11,650,917 B2
(45) Date of Patent: May 16, 2023

(54) ADJUSTABLE BUFFER MEMORY SPACE

(71) Applicant: Micron Technology, Inc., Boise, ID (US)

(72) Inventor: Kevin R Brandt, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/843,639

(22) Filed: Jun. 17, 2022

(65) Prior Publication Data

US 2022/0327051 A1 Oct. 13, 2022

Related U.S. Application Data

(62) Division of application No. 16/941,177, filed on Jul. 28, 2020, now Pat. No. 11,366,754.

(51) Int. Cl.
*G06F 12/06* (2006.01)
*G06F 12/10* (2016.01)
*G06F 13/16* (2006.01)
*G06F 12/1009* (2016.01)
*G06F 13/42* (2006.01)

(52) U.S. Cl.
CPC ...... *G06F 12/0646* (2013.01); *G06F 12/1009* (2013.01); *G06F 13/1668* (2013.01); *G06F 13/4282* (2013.01); *G06F 2212/657* (2013.01); *G06F 2213/0026* (2013.01)

(58) Field of Classification Search
CPC ... G06F 12/0643; G06F 12/10; G06F 13/1668
See application file for complete search history.

(56) References Cited

U.S. PATENT DOCUMENTS

| 11,366,754 | B2 | 6/2022 | Brandt | |
|---|---|---|---|---|
| 2011/0060887 | A1* | 3/2011 | Thatcher | G06F 3/064 |
| | | | | 711/E12.001 |
| 2011/0296133 | A1* | 12/2011 | Flynn | G06F 3/0652 |
| | | | | 711/171 |
| 2020/0065256 | A1 | 2/2020 | Palmer | |
| 2022/0035738 | A1 | 2/2022 | Brandt | |

FOREIGN PATENT DOCUMENTS

| CN | 103562883 | 2/2014 |
|---|---|---|
| CN | 109933541 | 6/2019 |
| CN | 114003517 | 2/2022 |

OTHER PUBLICATIONS

"Chinese Application Serial No. 202110858435.X, Office Action dated Aug. 10, 2022", with English translation, 13 pages.
U.S. Appl. No. 16/941,177, U.S. Pat. No. 11,366,754, filed Jul. 28, 2020, Adjustable Buffer Memory Space.

* cited by examiner

*Primary Examiner* — David E Martinez
(74) *Attorney, Agent, or Firm* — Schwegman Lundberg & Woessner, P.A.

(57) ABSTRACT

Various embodiments described herein provide for adjusting (e.g., increasing) buffer memory space, provided by memory (e.g., active memory) of a memory sub-system used to store logical-to-physical memory address (L2P) mapping data, by reducing the amount of L2P mapping data stored on the memory.

20 Claims, 11 Drawing Sheets

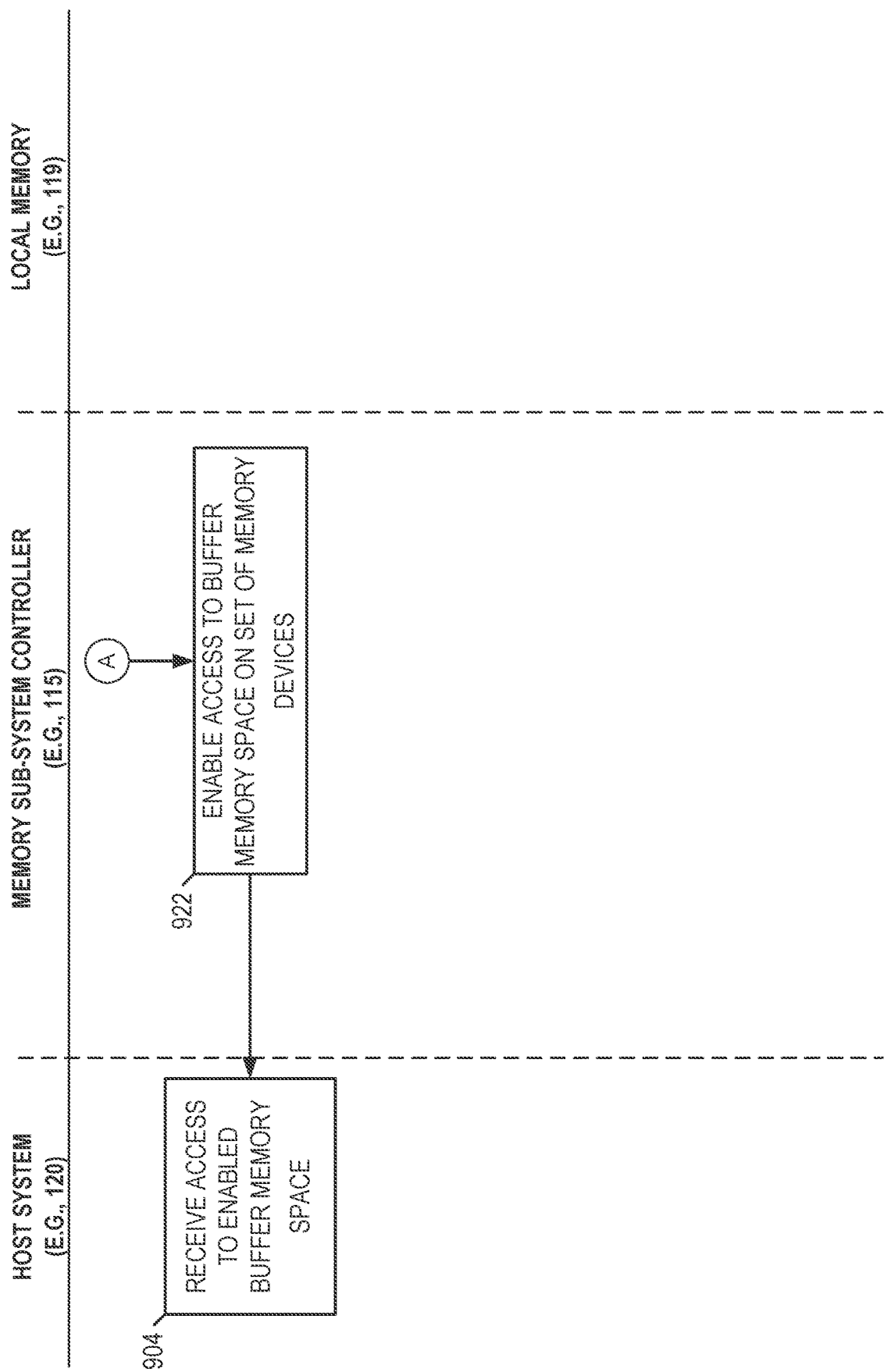

ADJUSTABLE BUFFER MEMORY SPACE

PRIORITY APPLICATION

This application is a divisional of U.S. application Ser. No. 16/941,177, filed Jul. 28, 2020, which is incorporated herein by reference in its entirety.

TECHNICAL FIELD

Embodiments of the disclosure relate generally to memory devices, and more specifically, relate to adjustable buffer memory space provided by a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 9A and 9B provide an interaction diagram illustrating interactions between components of a computing environment in the context of some embodiments in which a method for adjusting buffer memory space provided by a memory sub-system as described herein is performed.

DETAILED DESCRIPTION

Figure 1:
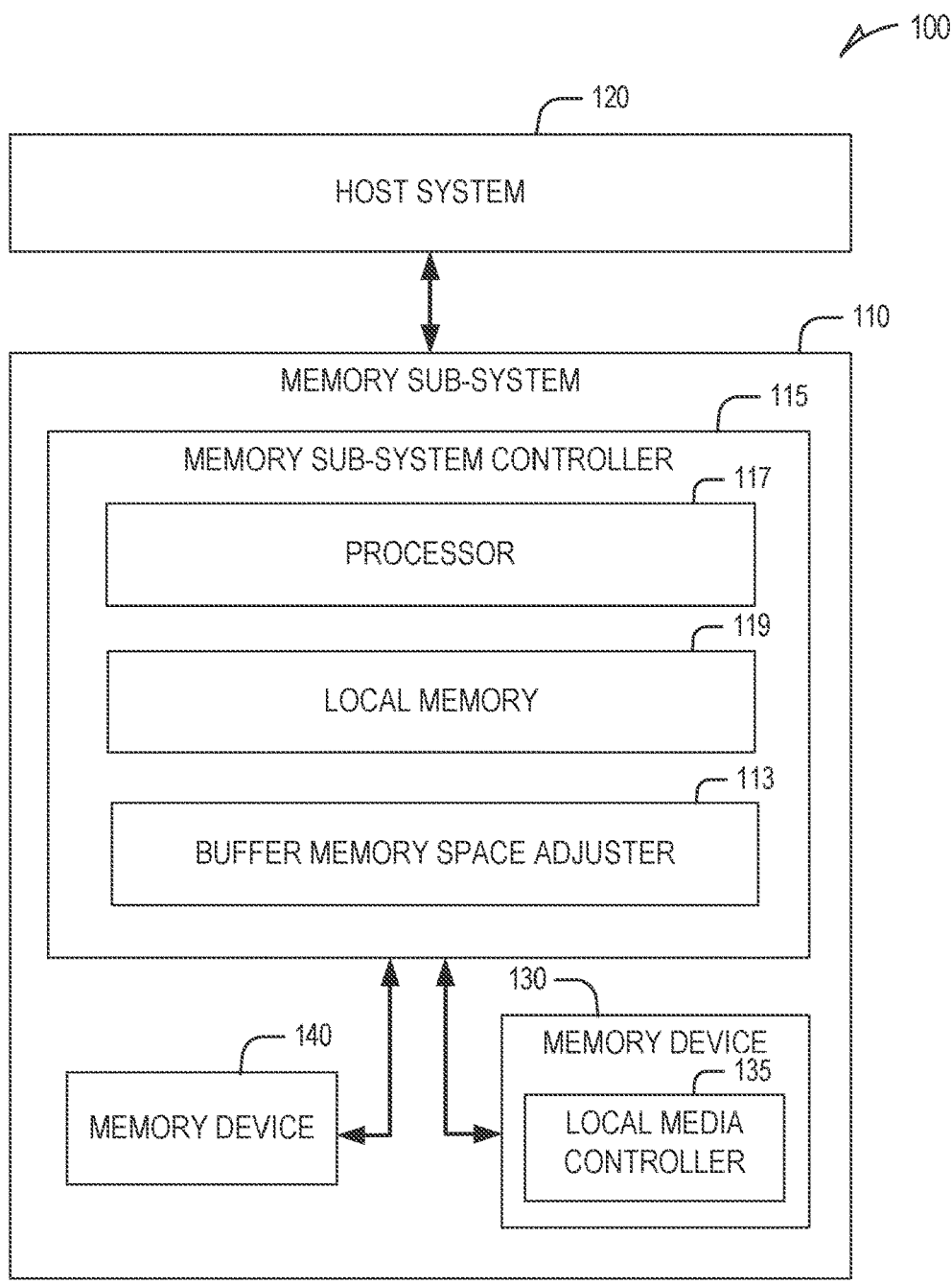
FIG. 1 is a block diagram illustrating an example computing system that includes a memory sub-system in accordance with some embodiments of the present disclosure.

Aspects of the present disclosure are directed to adjusting buffer memory space provided by a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command,) to the memory sub-system, such as to store data on a memory device at the memory sub-system, to read data from the memory device on the memory sub-system, or to write/read constructs (e.g., such as submission and completion queues) with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, etc.

A memory device can be a non-volatile memory device. A non-volatile memory device is a package of one or more die. Each die can be comprised of one or more planes. For some types of non-volatile memory devices (e.g., negative-and (NAND)-type devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

Traditionally, a memory sub-system controller manages a logical-to-physical memory address mapping data (e.g., L2P table mapping logical block addresses (LBAs) to physical page addresses), which is often large and usually implemented using an array of entries (e.g., storing physical memory addresses). The logical-to-physical memory address mapping data may be used by the memory sub-system controller when, for example, the memory sub-system controller receives a memory command from a host system and that memory command (e.g., read or write command) has at least one associated logical memory address that needs to be mapped to a corresponding physical memory addresses before the memory command can be successfully executed.

Generally, during operation of a memory sub-system, the logical-to-physical memory address (L2P) mapping data may be stored in active memory (e.g., active memory of a memory sub-system controller, which can comprise one or more dynamic random access memory (DRAM) devices or one or more three-dimensional cross-point memory devices.

For some memory sub-systems, at least a portion of memory used to store the L2P mapping data can be exposed (e.g., rendered accessible) to a host system for use as buffer memory space (e.g., controller memory buffer (CMB)), to which the host system can write data or a construct (e.g., queue), from which the host system can read data or a construct, or to use as a data scratchpad. In certain applications, a host system can use buffer memory space exposed on the memory of a memory sub-system to avoid having to use a processor of the host system to relay data to the memory sub-system. For example, the buffer memory space can be used to queue data that is to be written to the memory sub-system for persistent storage without having to involve a processor (e.g., central processing unit (CPU)) of a host system to relay the data to the memory sub-system. The buffer memory space can be used, for instance, by a graphical processor unit (GPU) or a network interface card (NIC) of the host system to transfer data directly to the memory sub-system (e.g., GPU or NIC copies data to be written to the buffer memory space and, subsequently, the host system can then issue a command instructing the memory sub-system to write data from the buffer memory space to persistent storage on the memory sub-system).

Aspects of the present disclosure provide for adjusting (e.g., increasing) buffer memory space, provided by memory (e.g., active memory) of a memory sub-system used to store logical-to-physical memory address (L2P) mapping data, by reducing the amount of L2P mapping data stored on the memory. In particular, for some embodiments, the amount of L2P mapping data stored on the memory is reduced by way of changing a structure of the L2P mapping data so that it occupies less space on the memory, by way of reducing logical memory space (of a logical namespace) exposed for use by a host system, or by some combination of both. Some embodiments change a structure of the L2P mapping data by implementing or using L2P mapping data caching, by changing an indirection unit size of the L2P mapping data, or some combination thereof. Additionally, some embodiments reduce logical memory space exposed to the host system by capping the amount of L2P mapping data stored on the memory, by using thin provisioning of one or more namespaces (which results in overprovision storage space that is locked in size and storage location for each of the one or more namespace), or some combination thereof. By reducing the size of L2P mapping data stored on the memory, additional unused data storage space results on the memory, where this additional unused data storage space represents storage space that is saved from the reduction and that would otherwise be used to store L2P mapping data on the memory. For some embodiments, buffer memory space on the memory can be adjusted to use some or all of the additional unused data storage space that results from L2P mapping data reduction.

As described herein, the reduction of L2P mapping data (e.g., the L2P table) stored on memory of a memory sub-system results can be facilitated by reduction in the logical memory space (e.g., local blocks or logical capacity of a namespace) available (e.g., exposed) to a host system for access. Accordingly, for some embodiments, the reduction of the L2P mapping data by reducing the exposed logical memory space of a namespace is balanced with an increase in buffer memory space available to or accessible by a host system (e.g., reduction in logical memory space available or exposed to the host system can facilitate an increase of buffer memory space available or exposed to the host system). Examples of this balance are illustrated in Table 1 below with respect to a memory sub-system that is using a local memory (e.g., of a memory sub-system controller) to store L2P mapping data. As noted in the table, the buffer memory space available assumes 256 MiB of the local memory is used by the miscellaneous/overhead data.

TABLE 1

| Logical Memory Space Capacity of Memory Sub-System (MiB) | Local Memory Density (MiB) | Memory Space Available as Buffer Memory Space (MiB) (with 256 MiB for Misc/Overhead Data) Using 4K Indirection Unit Size |
|---|---|---|
| 400 | 2048 | 1421 |
| 480 | 2048 | 1346 |
| 800 | 2048 | 1047 |
| 960 | 2048 | 898 |
| 1600 | 2048 | <299 |
| 1920 | 2048 | <1 |

Depending on the embodiment, memory of a memory sub-system used to store L2P mapping data and provide buffer memory space can comprise one or more volatile memory devices, such as one or more DRAM or SRAM devices, or one or more non-volatile memory devices, such as three-dimensional cross-point memory devices. For some embodiments, where the active memory comprises one or more volatile memory devices (e.g., DRAM devices), the buffer memory space implements a controller memory buffer (CMB), such as a CMB accessible by a host system via a Base Address Register (BAR) space in accordance with a Peripheral Component Interconnect Express (PCIe) standard. Additionally, for some embodiments, where the active memory comprises one or more non-volatile memory devices (e.g., three-dimensional cross-point memory devices), the buffer memory space implements a persistent memory region (PMR), such as a Non-Volatile Memory Express (NVMe) PMR.

By use of various embodiments, buffer memory space on memory (e.g., DRAM) of a memory sub-system can be adjusted (e.g., increased) at the request (e.g., instruction or command) of a host system without having to add additional memory devices (e.g., additional DRAM devices) to the memory sub-system. Additionally, various embodiments enable a host system to adjust (e.g., increase or decrease) buffer memory space of a memory sub-system to be adjusted (e.g., overtime) based on different use cases/applications of the memory sub-system. For example, a particular use case/application may use (or benefit from using) the buffer memory space to store a data queue for the memory sub-system, and the ability to adjust (e.g., increase) the buffer memory space can enable the buffer memory space to support a queue size (e.g., queue depth) that is suitable or beneficial to the use case/application. Furthermore, various embodiments can enable a single memory sub-system architecture to support (e.g., provide) different sizes of buffer memory spaces (e.g., based on adjustment or tuning requests from a host system), thereby reducing the number of different memory sub-system architectures needed to provide different SKUs.

As used herein, data storage space can also be referred to simply as storage space or space. Additionally, as used herein, a namespace (or logical address namespace) can provide a logical address space (for a logical memory space of logical memory blocks that map to physical memory blocks) that is separate/segregated from another logical address space (for another logical memory space) associated with another namespace. In some instances, separate namespaces can be created on a memory sub-system for separate applications being operated on the memory sub-system (e.g., server using the memory sub-system uses separate namespaces for separate server software services). An example of a namespace can include, without limitation, a NVMe namespace. According to various embodiments, each namespace is assigned its own data storage space (assigned storage space) in the data storage space allocated for storage of L2P mapping data on a memory device. For a given namespace of the memory sub-system, assigned data storage space for the given namespace is used to store L2P mapping data that maps logical memory addresses of the given namespace to physical memory addresses on the memory sub-system. Depending on the embodiment, a given namespace can be overprovisioned, such that the amount of data storage space (from the data storage space allocated to L2P mapping data storage) assigned (e.g., provisioned) to the given namespace is more than needed to store L2P mapping data for the logical address addresses (e.g., size of the logical address space) being made available by the given namespace. Herein, the extra assigned data storage space for the given namespace can be referred to as overprovision storage space. For various embodiments, the overprovision storage space associated with a given namespace can be fixed in size and locked at a location within the allocated storage space (e.g., a location relative to the allocated data storage space being used for thin provisioning the given namespace).

Disclosed herein are some examples of systems for adjusting buffer memory space provided by a memory sub-system, as described herein.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes buffer memory space adjuster 113 that enables or facilitates adjusting buffer memory space provided by a memory device of the memory sub-system 110 as described herein. For example, for some embodiments, the local memory 119 stores logical-to-physical memory address (L2P) mapping data for the memory sub-system 110, and the buffer memory space adjuster 113 enables or facilitates adjusting buffer memory space provided by the local memory 119 of the memory sub-system 110 as described herein. Depending on the embodiment, the buffer memory space adjuster 113 can reduce or cap the amount of the L2P mapping data stored on the local memory 119, which can result in unused data storage space on the local memory 119. The buffer memory space adjuster 113 of some embodiments can adjust the buffer memory space provided by the local memory 119 to include (e.g., use) some or all of the resulting unused data storage space. As described herein, for some embodiments, the local memory 119 comprises one or more volatile memory devices (e.g., DRAM devices), and the buffer memory space provided by the local memory 119 implements a controller memory buffer (CMB), such as CMB accessible via a Base Address Register (BAR) space in accordance with a Peripheral Component Interconnect Express (PCIe) standard. Additionally, for some embodiments, the local memory 119 comprises one or more non-volatile memory devices (e.g., three-dimensional cross-point memory devices), and the buffer memory space provided by the local memory 119 implements a persistent memory region (PMR), such as an NVM Express (NVMe) PMR (e.g., that is accessible through BAR).

Figure 2:
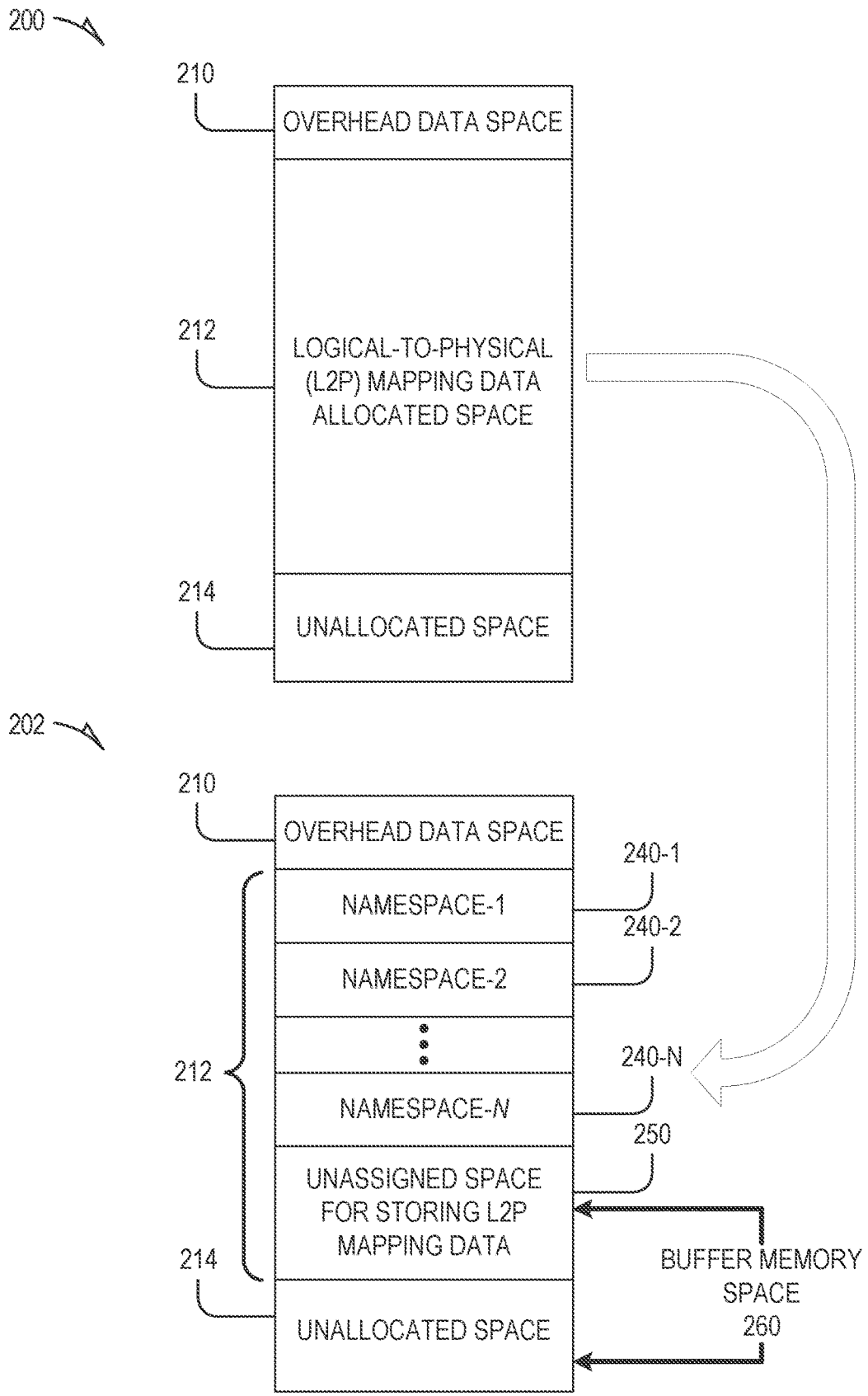
FIGS. 2 through 4 are block diagrams illustrating examples of adjusting a buffer memory space provided by a memory device of a memory sub-system, in accordance with some embodiments of the present disclosure.
Figure 3:
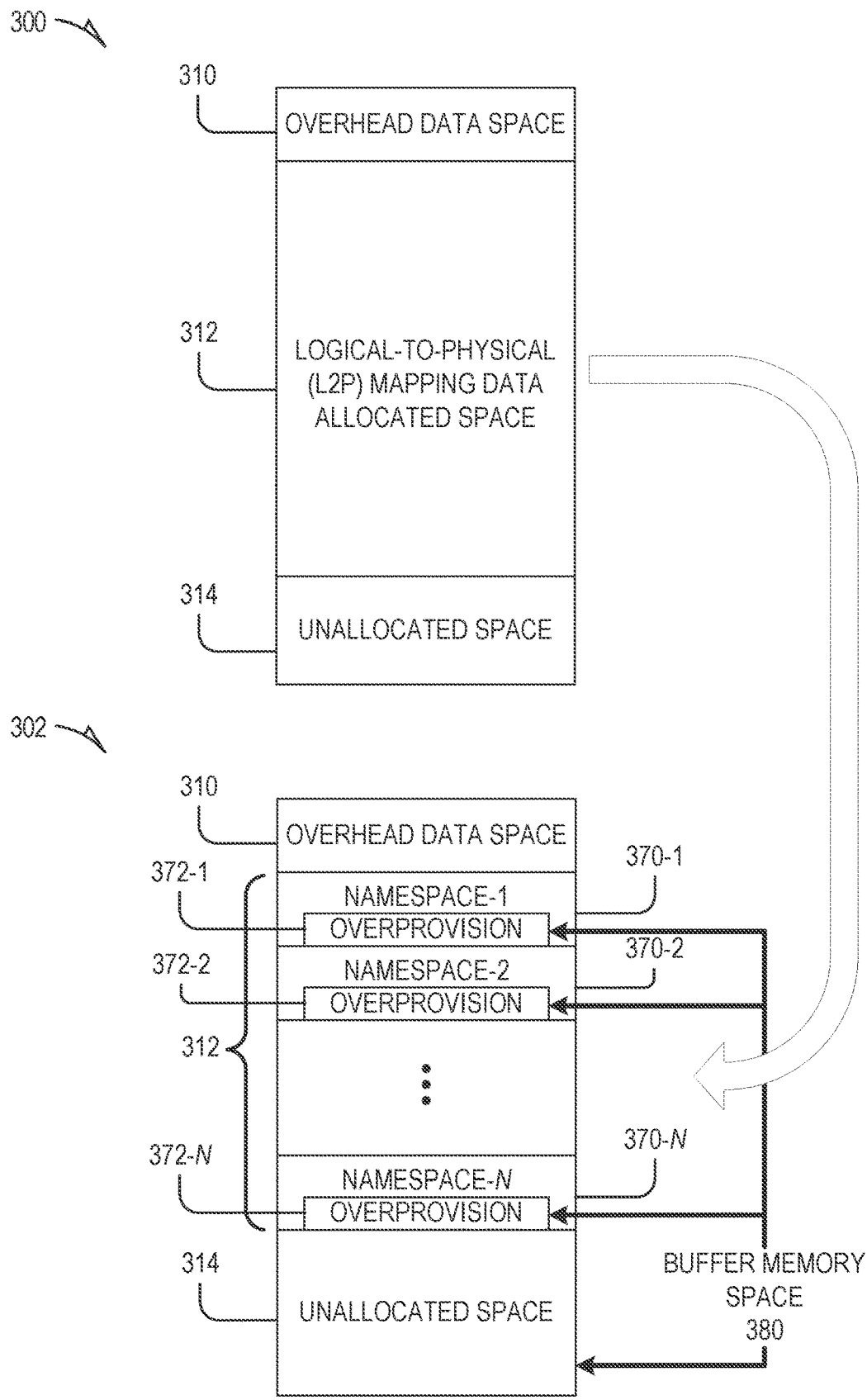
Figure 4:
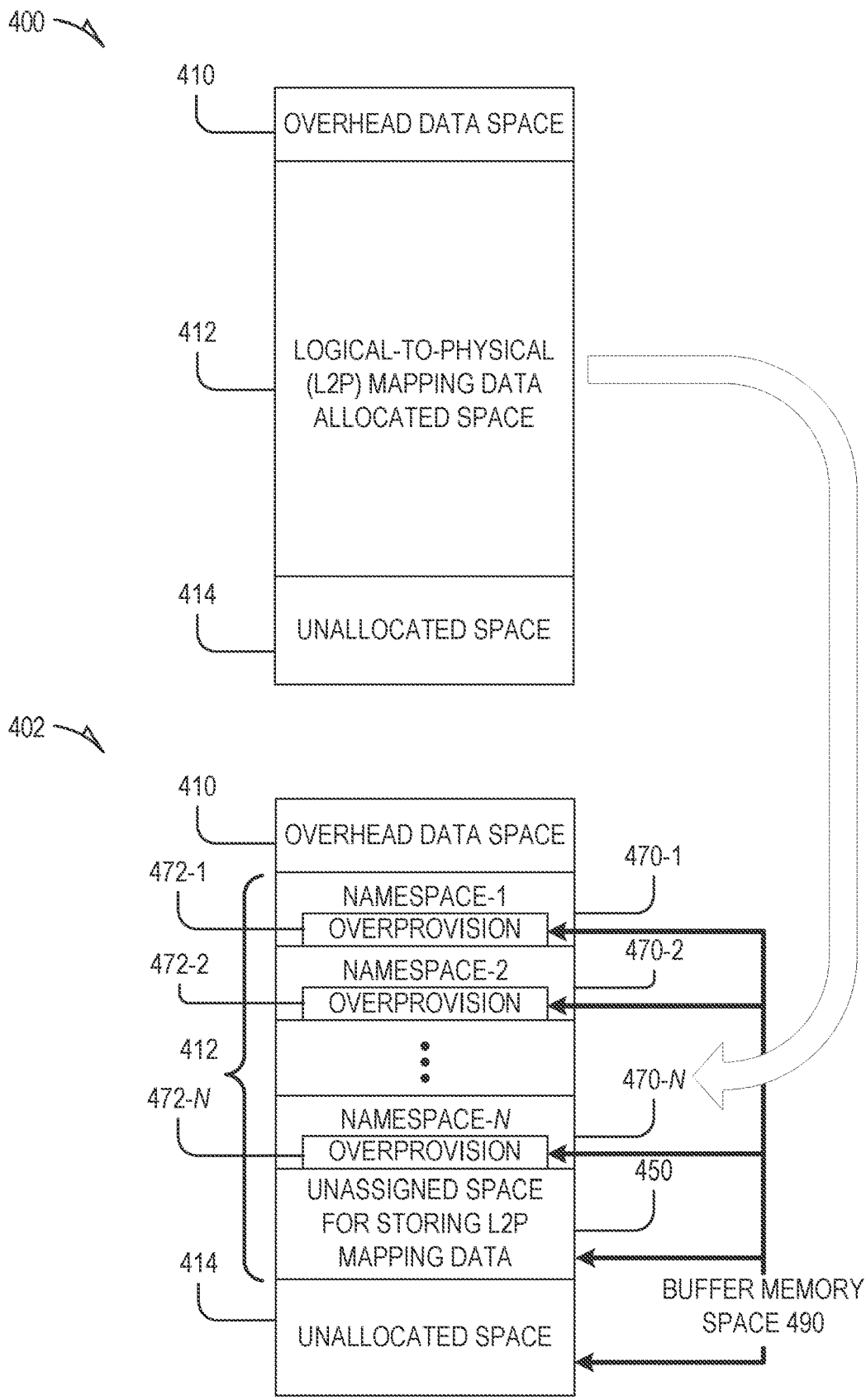

FIGS. 2 through 4 are block diagrams illustrating examples of adjusting a buffer memory space provided by a memory device (e.g., the local memory 119) of a memory sub-system (e.g., the memory sub-system 110), in accordance with some embodiments of the present disclosure. In particular, FIG. 2 illustrates using unassigned storage space and unallocated storage space to provide buffer memory space 260, FIG. 3 illustrates using overprovision storage space and unallocated storage space to provide buffer memory space 380, and FIG. 4 illustrates using overprovision storage space, unassigned storage space, and unallocated storage space to provide buffer memory space 490.

Referring now to FIG. 2, the figure illustrates example data storage usage 200 of a memory device prior to an embodiment described herein being applied (e.g., enabled), and further illustrates example data storage usage 202 of the same memory device while providing the buffer memory space 260 in accordance with various embodiments described herein. As shown, the data storage usage 200 of the memory device comprises: overhead data space 210, which can represent storage space to store data used by a memory sub-system controller to operate a memory sub-system; L2P mapping data allocated space 212, which represents data storage space allocated to store L2P mapping data for namespaces during operation of a memory sub-system; and unallocated space 214, which represents data storage space not presently allocated (i.e., not presently allocated for storing L2P mapping data). The unallocated space 214 can be used as buffer memory space of the memory sub-system.

Like the data storage usage 200, the data storage usage 202 of the memory device comprises the overhead data space 210, the L2P mapping data allocated space 212, and the unallocated space 214. As shown, the L2P mapping data allocated space 212 comprises assigned storages spaces 240-1 through 240-N to store L2P mapping data respectively for namespaces 1 through N. As also shown, the L2P mapping data allocated space 212 comprises unassigned space for storing L2P mapping data 250 (hereafter, the unassigned space 250), which represents the portion of the L2P mapping data allocated space 212 not presently assigned to any existing namespaces. Generally, a new namespace created on the memory sub-system (e.g., new namespace-N+1) could be assigned data storage space from the unassigned space 250, and the removal of an existing namespace could result in data storage space in the L2P mapping data allocated space 212 assigned to the existing namespace being unassigned (e.g., released for usage by another namespace), which would increase the size of the unassigned space 250. According to various embodiments, the L2P mapping data allocated space 212 is capped (e.g., locked) such that storage space from the unassigned space 250 is prevented from being assigned to another (e.g., new) namespace. For example, according to some embodiments, once enabled some embodiments cause the assigned storage spaces 240-1 through 240-N can remain assigned to the namespace 1 through N, while assignment of data storage space from the unassigned space 250 to any new namespace N+1 would be denied or prevented. Depending on the embodiment, the removal of one of the existing namespaces 1 through N can release a corresponding one of the assigned storage spaces 240-1 through 240-N for use by another (e.g., new) namespace, while continuing to deny/prevent assignment of data storage space from the unassigned space 250 to any new or existing namespace.

According to some embodiments, after the L2P mapping data storage is capped (e.g., locked), at least some (e.g., all) of the unassigned space 250 from the L2P mapping data allocated space 212, and at least some (e.g., all) of the unallocated space 214, are used as the buffer memory space 260 provided by a memory sub-system. As a result, the buffer memory space 260 has been adjusted to use the unassigned space 250 to increase its memory space over just using the unallocated space 214. Depending on the embodiment, the L2P mapping data storage capping and usage of the unassigned space 250 and the unallocated space 214 as the buffer memory space 260 can be performed based on a request (e.g., instruction or command) received by a memory sub-system from a host system during the memory sub-system's operation. Additionally, enabling the L2P mapping data storage capping and usage of the unassigned space 250 and the unallocated space 214 as the buffer memory space 260 can involve restarting the memory sub-system (e.g., to permit the buffer memory space 260 to adjust [based on the change in data storage space] the size reported to the host system). For some embodiments, the L2P mapping data storage cap (e.g., lock) can be disabled or removed (e.g., when the buffer memory space 260 does not need additional storage space provided by the unassigned space 250) such that assignment of a portion of the unassigned space 250 (e.g., to a new namespace) can resume. After the L2P mapping data storage cap (e.g., lock) is disabled or removed, the buffer memory space 260 can be adjusted (e.g., readjusted) to use just the unallocated space 214 as storage space.

Referring now to FIG. 3, the figure illustrates example data storage usage 300 of a memory device prior to an embodiment described herein being applied (e.g., enabled), and further illustrates example data storage usage 302 of the same memory device while providing the buffer memory space 380 in accordance with various embodiments described herein. As shown, the data storage usage 300 of the memory device is similar to the data storage usage 200 described with respect to FIG. 2, with overhead data space 310 being similar to the overhead data space 210, L2P mapping data allocated space 312 being similar to the L2P mapping data allocated space 212, and unallocated space 314 being similar to the unallocated space 214.

Like the data storage usage 300, the data storage usage 302 of the memory device comprises the overhead data space 310, the L2P mapping data allocated space 312, and the unallocated space 314. As shown, the L2P mapping data allocated space 312 comprises assigned storages spaces 370-1 through 370-N to store L2P mapping data respectively for namespaces 1 through N, and those namespaces comprise overprovision spaces 372-1 through 372-N respectively. As described herein, each of the overprovision spaces 372-1 through 372-N can represent extra data storage space assigned (e.g., provisioned) to their respective namespaces. According to various embodiments, each of the overprovision spaces 372-1 through 372-N are locked in the L2P mapping data allocated space 312 such that the memory system (e.g., the memory sub-system controller) is prevented or denied from using any of the overprovision spaces 372-1 through 372-N for storing L2P mapping data for any namespace (existing or new).

According to some embodiments, at least some (e.g., all) of the overprovision spaces 372-1 through 372-N, and at least some (e.g., all) of the unallocated space 314, are used as the buffer memory space 380 provided by a memory sub-system. As a result, the buffer memory space 380 has been adjusted to use the overprovision spaces 372-1 through 372-N to increase its memory space over just using the unallocated space 314. Depending on the embodiment, usage of the overprovision spaces 372-1 through 372-N and the unallocated space 314 as the buffer memory space 380 can be performed based on a request (e.g., instruction or command) received by a memory sub-system from a host system during the memory sub-system's operation. Additionally, usage of the overprovision spaces 372-1 through 372-N and the unallocated space 314 as the buffer memory space 380 can involve restarting the memory sub-system (e.g., to permit the buffer memory space 380 to adjust [based on the change in data storage space] the size reported to the host system). For some embodiments, the usage of the overprovision spaces 372-1 through 372-N can be disabled, which can result in the buffer memory space 380 being adjusted (e.g., readjusted) to use just the unallocated space 314 as storage space.

Referring now to FIG. 4, the figure illustrates example data storage usage 400 of a memory device prior to an embodiment described herein being applied (e.g., enabled), and further illustrates example data storage usage 402 of the same memory device while providing the buffer memory space 490 in accordance with various embodiments described herein. As shown, the data storage usage 400 of the memory device is similar to the data storage usage 200 described with respect to FIG. 2, with overhead data space 410 being similar to the overhead data space 210, L2P mapping data allocated space 412 being similar to the L2P mapping data allocated space 212, and unallocated space 414 being similar to the unallocated space 214.

Like the data storage usage 400, the data usage 402 of the memory device comprises the overhead data space 410, the L2P mapping data allocated space 412, and the unallocated space 414. As shown, the L2P mapping data allocated space 412 comprises assigned storages spaces 470-1 through 470-N to store L2P mapping data respectively for namespaces 1 through N, and those namespaces comprise overprovision spaces 472-1 through 472-N respectively. As described herein, each of the overprovision spaces 472-1 through 472-N can represent extra data storage space assigned (e.g., provisioned) to their respective namespaces. According to various embodiments, each of the overprovision spaces 472-1 through 472-N are locked in the L2P mapping data allocated space 412 such that the memory system (e.g., the memory sub-system controller) is prevented or denied from using any of the overprovision spaces 472-1 through 472-N for storing L2P mapping data for any namespace (existing or new).

As further shown, the L2P mapping data allocated space 412 comprises unassigned space for storing L2P mapping data 450 (hereafter, the unassigned space 450), which represents the portion of the L2P mapping data allocated space 412 not presently assigned to any existing namespaces. As described herein, a new namespace created on the memory sub-system (e.g., new namespace-N+1) could be assigned data storage space from the unassigned space 450, and the removal of an existing namespace could result in data storage space in the L2P mapping data allocated space 412 assigned to the existing namespace being unassigned (e.g., released for usage by another namespace), which would increase the size of the unassigned space 450. According to various embodiments, the L2P mapping data allocated space 412 is capped (e.g., locked) such that storage space from the unassigned space 450 is prevented from being assigned to another (e.g., new) namespace. For example, according to some embodiments, once enabled some embodiments cause the assigned storage spaces 470-1 through 470-N (with their respective overprovision spaces 472-1 through 472-N) can remain assigned to the namespace 1 through N, while assignment of data storage space from the unassigned space 450 to any new namespace N+1 would be denied or prevented.

According to some embodiments, after the L2P mapping data storage is capped (e.g., locked), at least some (e.g., all) of the overprovision spaces 472-1 through 472-N, at least some (e.g., all) of the unassigned space 450 from the L2P mapping data allocated space 412, and at least some (e.g., all) of the unallocated space 414, are used as the buffer memory space 490 provided by a memory sub-system. As a result, the buffer memory space 490 has been adjusted to use the overprovision spaces 472-1 through 472-N and the unassigned space 450 to increase its memory space over just using the unallocated space 414. Depending on the embodiment, the L2P mapping data storage capping and usage of the unassigned space 450, usage of the overprovision spaces 472-1 through 472-N, and the unallocated space 414 as the buffer memory space 490 can be performed based on a request (e.g., instruction or command) received by a memory sub-system from a host system during the memory sub-system's operation. Additionally, usage of the unassigned space 450, the overprovision spaces 472-1 through 472-N, and the unallocated space 414 as the buffer memory space 490 can involve restarting the memory sub-system (e.g., to permit the buffer memory space 490 to adjust [based on the change in data storage space] the size reported to the host system). For some embodiments, the L2P mapping data storage cap (e.g., lock) can be disabled or removed (e.g., when the buffer memory space 490 does not need additional storage space provided by the unassigned space 450) such that assignment of a portion of the unassigned space 450 (e.g., to a new namespace) can resume. Additionally, the usage of the usage of the overprovision spaces 472-1 through 472-N can be disabled. For some embodiments, after the L2P mapping data storage cap (e.g., lock) is disabled or removed and the usage of the usage of the overprovision spaces 472-1 through 472-N is disabled, the buffer memory space 490 can be readjusted to use just the unallocated space 414 as storage space.

FIGS. 5 through 8 are flow diagrams of example methods for adjusting buffer memory space provided by a memory sub-system, in accordance with some embodiments of the present disclosure. The methods 500, 600, 700, 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 500, 600, 700, 800 is performed by the memory sub-system controller 115 of FIG. 1 based on the buffer memory space adjuster 113. Additionally, or alternatively, for some embodiments, at least one of the methods 500, 600, 700, 800 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Figure 5:
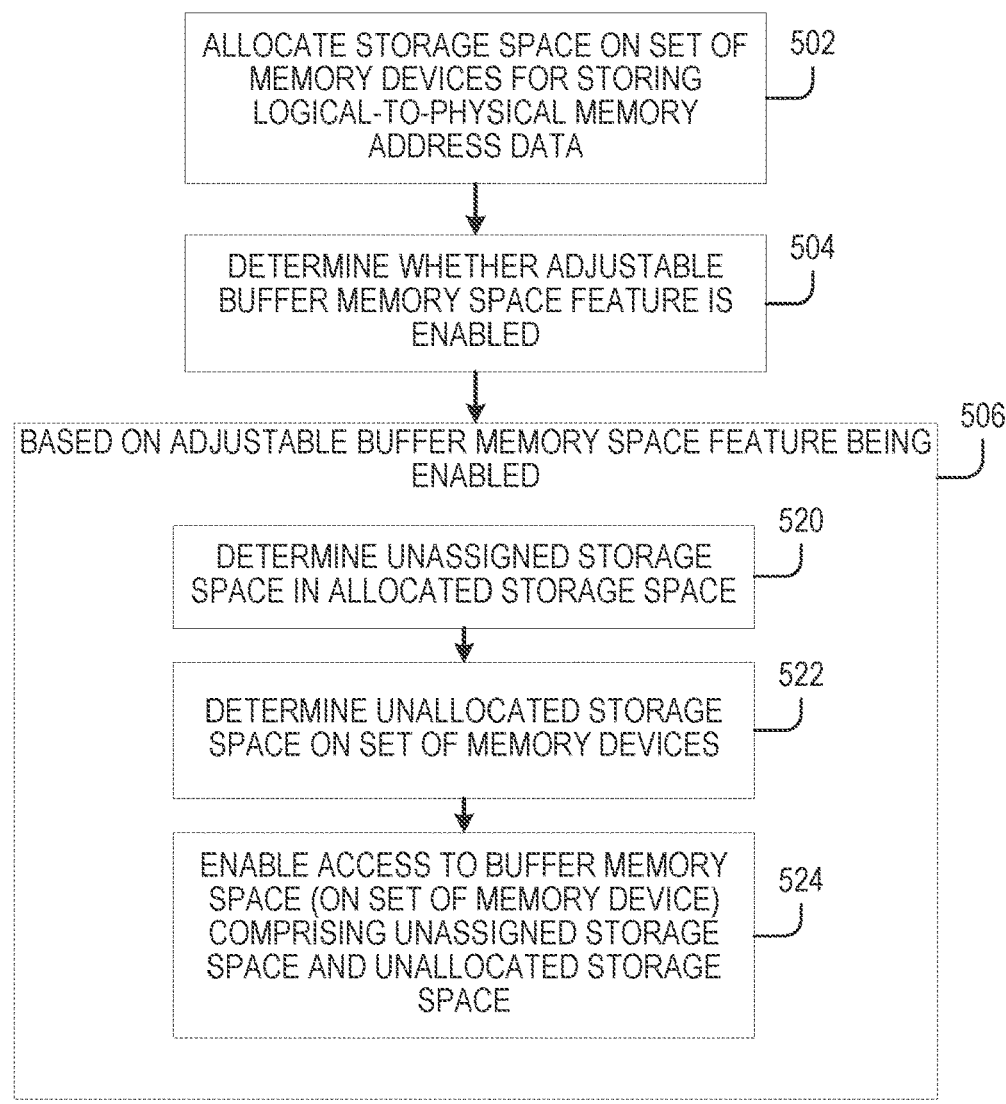
FIGS. 5 through 8 are flow diagrams of example methods for adjusting buffer memory space provided by a memory sub-system, in accordance with some embodiments of the present disclosure.
Figure 6:
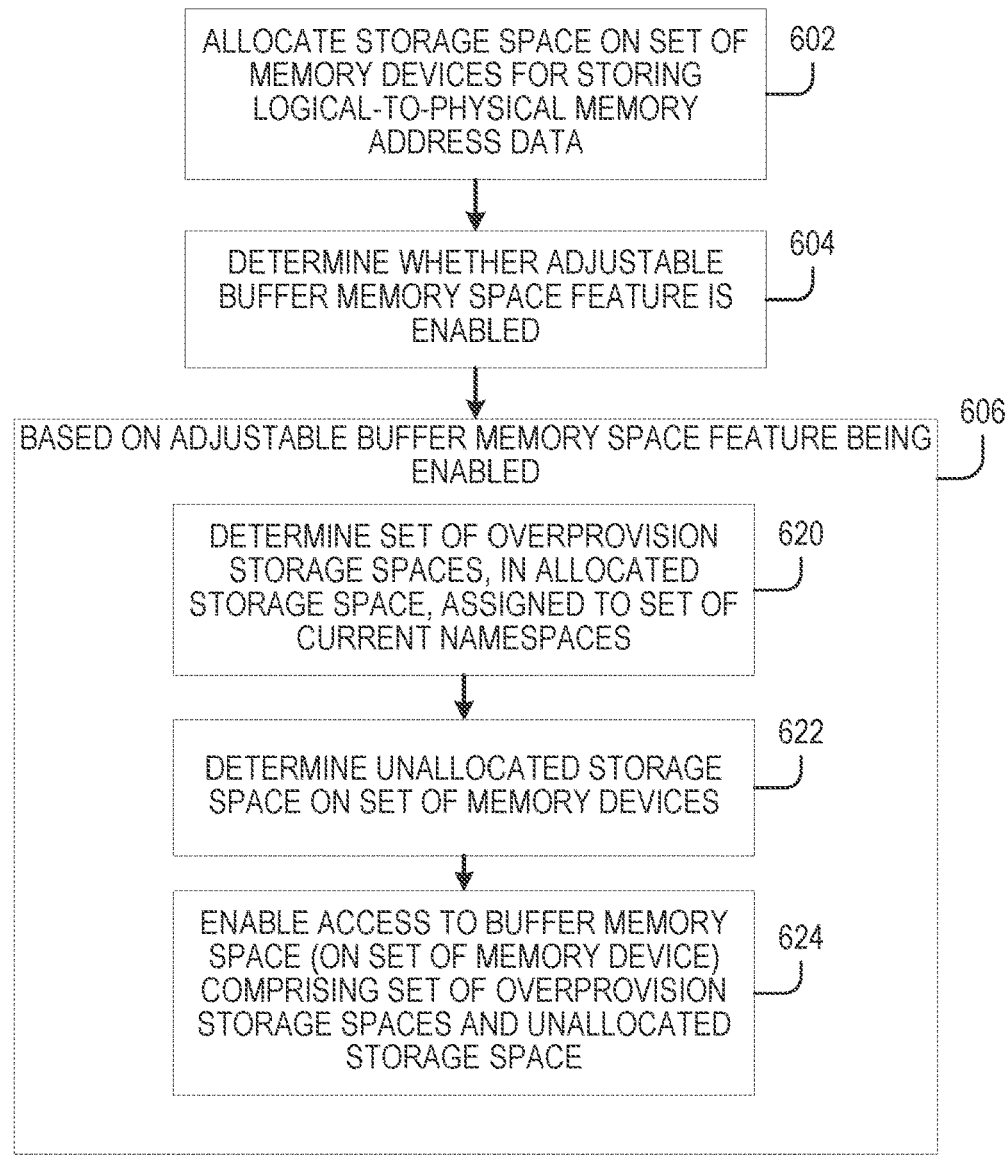
Figure 7:
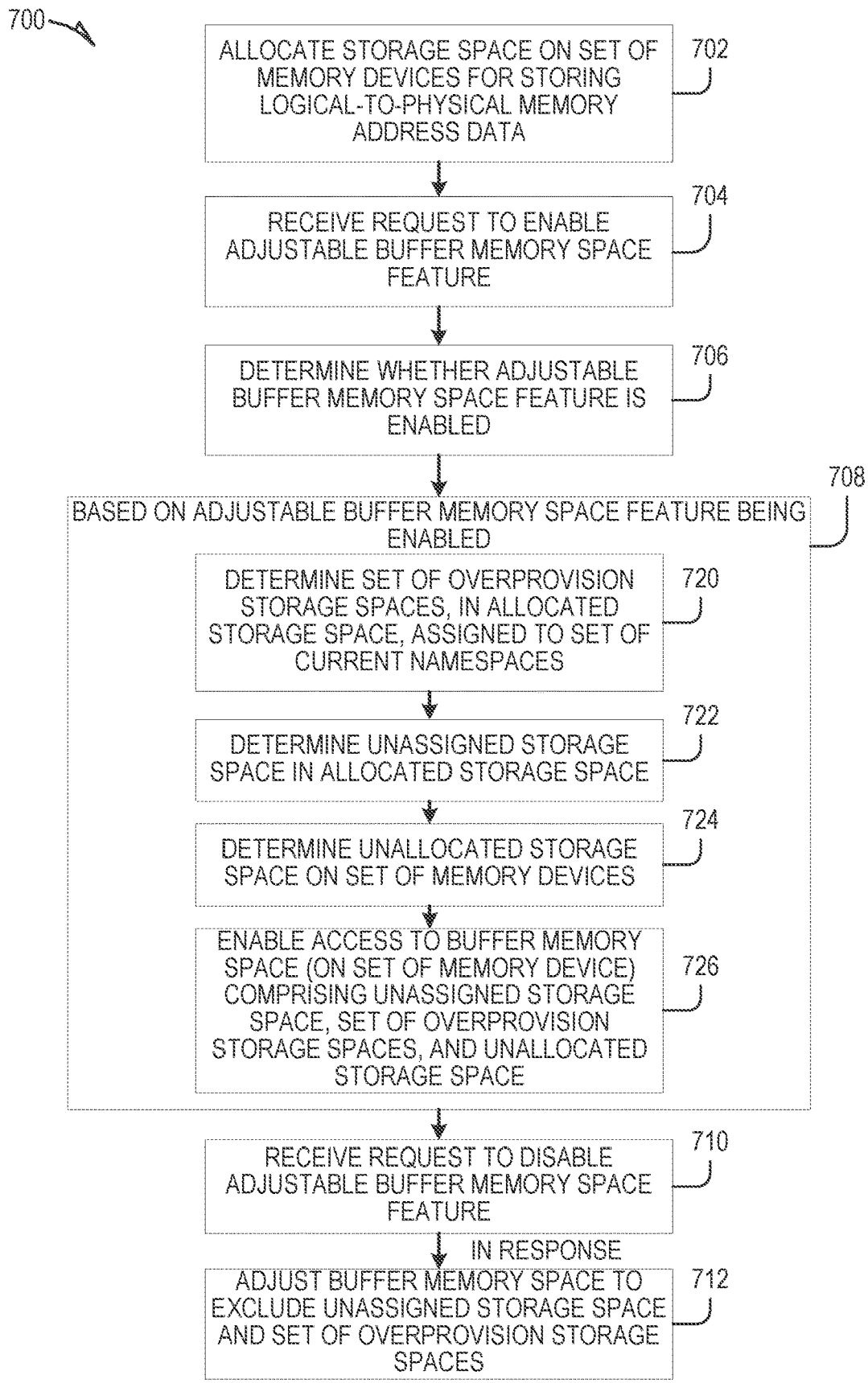

The methods 500, 600, 700 of FIGS. 5-7 relate to reducing logical memory space exposed by a memory sub-system for use by a host system, which can enable buffer memory space accessible by the host system to be adjusted (e.g., increased). Referring now to the method 500 of FIG. 5, at operation 502, a processing device (e.g., the processor 117 of the memory sub-system controller 115) allocates storage space (e.g., 212, 312, 412), on a set of memory devices (e.g., the local memory 119) of a memory sub-system (e.g., the memory sub-system 110), for storing logical-to-physical memory address mapping data that maps a logical memory address of a namespace (having a set of logical memory addresses) to a physical memory address, where the physical memory address corresponds to a data storage location on another set of memory devices (e.g., memory devices 130 and/or memory devices 140) of the memory sub-system. Depending on the embodiment, the set of memory devices used to store the logical-to-physical memory address mapping data and provide buffer memory space (as described herein) can comprise one or more volatile memory devices, such as DRAM devices, or one or more non-volatile memory devices, such as three-dimensional cross-point memory devices. During operation of the memory sub-system, one or more namespace will be created and removed on the memory sub-system, which can impact how much unassigned storage space remains on the set of memory devices. For instance, creation of a new namespace can result in assignment of a portion of the allocated storage space to the new namespace, which can result in a decrease in unassigned storage space. The removal of an existing namespace can result in the release (e.g., un-assignment) of its corresponding assigned storage space in the allocated storage space, which can result in an increase in unassigned storage space.

At operation 504, the processing device (e.g., processor 117) determines whether an adjustable buffer memory space feature is enabled on the memory sub-system. According to some embodiments, the adjustable buffer memory space feature enables buffer memory space to be increased (e.g., expanded) by using data storage space that would otherwise be assigned (e.g., reserved) on the set of memory device (e.g., the local memory 119) for storing logical-to-physical memory address mapping data for a given namespace.

At operation 506, the processing device (e.g., processor 117) performs operations 520 through 524 based on the adjustable buffer memory being enabled. In particular, for some embodiments, operations 520 through 524 are performed when the adjustable buffer memory is enabled, and not performed when the adjustable buffer memory is disabled. As described herein, when the adjustable buffer memory is disabled, the buffer memory space offered by the memory sub-system can be limited to the unallocated storage space (e.g., the storage space external to storage space for storing overhead data and external to the storage space allocated for storing the logical-to-physical memory address mapping data) on the set of memory devices (e.g., the local memory 119).

At operation 520, the processing device (e.g., processor 117) determines (e.g., identifies) unassigned storage space (e.g., 250, 450) in the allocated storage space (allocated by operation 502 for storing logical-to-physical memory address mapping data). For some embodiments, determining the unassigned storage space can comprise determining how much unassigned storage space is available or where the unassigned storage space is located on the set of memory devices. Additionally, at operation 522, the processing device (e.g., processor 117) determines (e.g., identifies) unallocated storage space on the set of memory devices (data storage space external to the data storage space allocated to store L2P mapping data). For some embodiments, determining the unallocated storage space can comprise determining how much unallocated storage space is available or where the unallocated storage space is located on the set of memory devices.

At operation 524, the processing device (e.g., processor 117) enables, for a host system coupled to the memory sub-system, access to buffer memory space on the set of memory devices, where the buffer memory space comprises a portion (e.g., some or all) of the unallocated storage space determined by operation 522 and a portion (e.g., some or all) of the unassigned storage space determined by operation 520. For some embodiments, the portion or amount of the unallocated storage space or the unassigned storage space used as the buffer memory space is based on a request (e.g., instruction) from the host system coupled to the memory sub-system. After access to the buffer memory space is enabled by operation 524, some embodiments reserve the unassigned storage space and the unallocated storage space for use as part of the buffer memory space. Once reserved, any request or attempt to use the unassigned storage space or the unallocated storage space for something other than buffer memory space can be prevented or denied by the memory sub-system (e.g., by the memory sub-system controller 115). For example, after the unassigned storage space and the unallocated storage space are reserved for use as part of the buffer memory space, the memory sub-system may receive a request for (creation of) a new namespace of logical memory addresses on the memory sub-system. In response to the request for the new namespace, the memory sub-system can determine whether the new namespace can be provisioned without assigning the unallocated storage space (e.g., can be provisioned by assigning storage space from the allocated storage space that was freed after removal of an existing namespace). In response to determining that the new namespace cannot be provisioned without assigning the unallocated storage space, the request from the host system can be denied or prevented by the memory sub-system. Reserving the unallocated storage space can effectively cap (or freeze) the amount of storage space available on the set of memory devices for storing L2P mapping data at the time the adjustable buffer memory space feature is enabled. For some embodiments, the unassigned storage space and the unallocated storage remain reserved until the adjustable buffer memory space feature is disabled. Via the host system, a user can disable the adjustable buffer memory space feature in order to revert the memory sub-system and the buffer memory space to a traditional configuration.

Where the set of memory devices comprises one or more volatile memory devices (e.g., DRAM devices), the buffer memory space can implement a CMB, such as a CMB accessible by the host system via a BAR space in accordance with a PCIe standard. Additionally, where the set of memory devices comprises one or more non-volatile memory devices (e.g., three-dimensional cross-point memory devices), the buffer memory space can implement a PMR, such as an NVMe PMR. For some embodiments, enabling access to the buffer memory space comprises restarting or resetting the memory sub-system to adjust a storage size of the buffer memory space reported to the host system (to account for the inclusion of the portion of the unassigned storage spaces as part of the buffer memory space). For example, where the buffer memory space is accessed by the host system using BAR space, the restart of the memory sub-system can enable the BAR space to be adjusted to reflect the current storage space of the buffer memory (e.g., what is accessible by the host system and what is being reported to the host system as being accessible).

For some embodiments, the memory sub-system can receive, from the host system, a request to disable the adjustable buffer memory space feature. In response, the processing device (e.g., processor 117) can adjust the buffer memory space to exclude (e.g., remove), from the buffer memory space, the portion of the set of overprovision storage spaces. For some embodiments, disabling the adjustable buffer memory space feature comprises restarting or resetting the memory sub-system to adjust a storage size of the buffer memory space reported to the host system (to account for the exclusion of the unassigned storage space from the buffer memory space).

Referring now to the method 600 of FIG. 6, according to some embodiments, operations 602 and 604 are respectively similar to the operations 502 and 504 of the method 500 described with respect to FIG. 5.

At operation 606, the processing device (e.g., processor 117) performs operations 620 through 624 based on the adjustable buffer memory being enabled. In particular, for some embodiments, operations 620 through 624 are performed when the adjustable buffer memory is enabled, and not performed when the adjustable buffer memory is disabled. As described herein, when the adjustable buffer memory is disabled, the buffer memory space offered by the memory sub-system can be limited to the unallocated storage space (e.g., the storage space external to storage space for storing overhead data and external to the storage space allocated for storing the logical-to-physical memory address mapping data) on the set of memory devices (e.g., the local memory 119).

At operation 620, the processing device (e.g., processor 117) determines (e.g., identifies) a set of overprovision storage spaces (e.g., 372, 472), in the allocated storage space, assigned to a set of current namespaces (e.g., 370, 470). For some embodiments, determining the set of overprovision storage spaces can comprise determining how much overprovision storage space is available or where each of the overprovision storage spaces is located on the set of memory devices. Additionally, at operation 622, the processing device (e.g., processor 117) determines (e.g., identifies) unallocated storage space on the set of memory devices (data storage space external to the data storage space allocated to store L2P mapping data). For some embodiments, determining the unallocated storage space can comprise determining how much unallocated storage space is available or where the unallocated storage space is located on the set of memory devices.

At operation 624, the processing device (e.g., processor 117) enables, for a host system coupled to the memory sub-system, access to buffer memory space on the set of memory devices, where the buffer memory space comprises a portion (e.g., some or all) of the unallocated storage space determined by operation 622 and a portion (e.g., some or all) of the set of overprovision storage spaces determined by operation 620. For some embodiments, the portion or amount of the unallocated storage space or the set of overprovision storage spaces used as the buffer memory space is based on a request (e.g., instruction) from the host system coupled to the memory sub-system. After access to the buffer memory space is enabled by operation 624, some embodiments reserve the unallocated storage space and the set of overprovision storage spaces for use as part of the buffer memory space. Once reserved, any request or attempt to use the set of overprovision storage spaces or the unallocated storage space for something other than buffer memory space can be prevented or denied by the memory sub-system (e.g., by the memory sub-system controller 115). For example, after the set of overprovision storage spaces and the unallocated storage space are reserved for use as part of the buffer memory space, the memory sub-system may receive a request for (creation of) adjust one or more of the overprovision storage spaces (e.g., increase or decrease the overprovision storage spaces) via a command (e.g., FormatNVM). In response to the request to adjust the one or more of the overprovision storage spaces, the request from the host system can be denied or prevented by the memory sub-system. For some embodiments, the set of overprovision storage spaces and the unallocated storage remain reserved until the adjustable buffer memory space feature is disabled. As described herein, via the host system, a user can disable the adjustable buffer memory space feature when they prefer to revert the memory sub-system and the buffer memory space to a traditional configuration.

As described herein, where the set of memory devices comprises one or more volatile memory devices (e.g., DRAM devices), the buffer memory space can implement a CMB, such as a CMB accessible by the host system via a BAR space in accordance with a PCIe standard. Additionally, where the set of memory devices comprises one or more non-volatile memory devices (e.g., three-dimensional cross-point memory devices), the buffer memory space can implement a PMR, such as an NVMe PMR. For some embodiments, enabling access to the buffer memory space comprises restarting or resetting the memory sub-system to adjust a storage size of the buffer memory space reported to the host system (to account for the inclusion of the portion of the set of overprovision storage spaces as part of the buffer memory space).

For some embodiments, the memory sub-system can receive, from the host system, a request to disable the adjustable buffer memory space feature. In response, the processing device (e.g., processor 117) can adjust the buffer memory space to exclude (e.g., remove), from the buffer memory space, the portion of the set of overprovision storage spaces. For some embodiments, disabling the adjustable buffer memory space feature comprises restarting or resetting the memory sub-system to adjust a storage size of the buffer memory space reported to the host system (to account for the exclusion of the set of overprovision storage spaces from the buffer memory space).

Referring now to the method 700 of FIG. 7, according to some embodiments, operation 702 is similar to the operation 502 of the method 500 described with respect to FIG. 5.

At operation 704, the processing device (e.g., processor 117) receives, from the host system, a request to enable the adjustable buffer memory space feature. For example, the request can comprise a command from the host system, such as a set command (e.g., NVMe Set Feature command), a vendor specific/unique command (e.g., a vendor specific (VS) command based on an NVMe protocol standard), a vendor specific (VS) bit on an existing command, or a side band command issued to the memory sub-system via a sideband bus interface (e.g., SMBUS) used for various administrative operations of the memory sub-system (e.g., uploading firmware from the host system to the memory sub-system). As an example preemptive approach for enabling the adjustable buffer memory space, the request can comprise one or more commands that enable the adjustable buffer memory space and specify how much logical address space is desired or how much buffer memory space is desired. As another example, the request can comprise a command that selects from a set number of options that predetermine how much data storage space is preserved for storing L2P mapping data and how much buffer memory space is provided. In yet another example, the request can comprise the host system selecting a buffer memory space size using the interface through which the buffer memory space is accessed by the host system (e.g., the host system selects a BAR size for the buffer memory space through an interface based on a PCIe standard).

At operation 706, the processing device (e.g., processor 117) determines whether the adjustable buffer memory space feature is enabled on the memory sub-system. For instance, where the request received at operation 704 to enable the adjustable buffer memory space feature is completed, operation 706 can determine that the adjustable buffer memory space feature is enabled. With respect to the method 700, the adjustable buffer memory space feature enables buffer memory space to be increased (e.g., expanded) by using data storage space that would otherwise be allocated (e.g., reserved) on the set of memory device (e.g., the local memory 119) for storing logical-to-physical memory address mapping data.

At operation 708, the processing device (e.g., processor 117) performs operations 720 through 726 based on the adjustable buffer memory being enabled. In particular, for some embodiments, operations 720 through 726 are performed when the adjustable buffer memory is enabled, and not performed when the adjustable buffer memory is disabled. As described herein, when the adjustable buffer memory is disabled, the buffer memory space offered by the memory sub-system can be limited to the unallocated storage space (e.g., the storage space external to storage space for storing overhead data and external to the storage space allocated for storing the logical-to-physical memory address mapping data) on the set of memory devices (e.g., the local memory 119).

At operation 720, the processing device (e.g., processor 117) determines (e.g., identifies) a set of overprovision storage spaces (e.g., 372, 472), in the allocated storage space, assigned to a set of current namespaces (e.g., 370, 470). As described herein, determining the set of overprovision storage spaces can comprise determining how much overprovision storage space is available or where each of the overprovision storage spaces is located on the set of memory devices. At operation 722, the processing device (e.g., processor 117) determines (e.g., identifies) unassigned storage space (e.g., 250, 450) in the allocated storage space (allocated by operation 702 for storing logical-to-physical memory address mapping data). As described herein, determining the unassigned storage space can comprise determining how much unassigned storage space is available or where the unassigned storage space is located on the set of memory devices. Additionally, at operation 724, the processing device (e.g., processor 117) determines (e.g., identifies) unallocated storage space on the set of memory devices (data storage space external to the data storage space allocated to store L2P mapping data). As described herein, determining the unallocated storage space can comprise determining how much unallocated storage space is available or where the unallocated storage space is located on the set of memory devices.

At operation 726, the processing device (e.g., processor 117) enables, for a host system coupled to the memory sub-system, access to buffer memory space on the set of memory devices, where the buffer memory space comprises a portion (e.g., some or all) of the unallocated storage space determined by operation 724, a portion (e.g., some or all) of the unassigned storage space determined by operation 722, and a portion (e.g., some or all) of the set of overprovision storage spaces determined by operation 720. For some embodiments, the portion or amount of the unallocated storage space, the unassigned storage space, or the set of overprovision storage spaces used as the buffer memory space is based on a request (e.g., instruction) from the host system coupled to the memory sub-system. After access to the buffer memory space is enabled by operation 726, some embodiments reserve the unassigned storage space and the set of overprovision storage spaces for use as part of the buffer memory space. Once reserved, any request or attempt to use, the unassigned storage space, the set of overprovision storage spaces, or the unallocated storage space for something other than buffer memory space can be prevented or denied by the memory sub-system (e.g., by the memory sub-system controller 115).

For example, after the unassigned storage space and the unallocated storage space are reserved for use as part of the buffer memory space, the memory sub-system may receive a request for (creation of) a new namespace of logical memory addresses on the memory sub-system. In response to the request for the new namespace, the memory sub-system can determine whether the new namespace can be provisioned without assigning the unallocated storage space (e.g., can be provisioned by assigning storage space from the allocated storage space that was freed after removal of an existing namespace). In response to determining that the new namespace cannot be provisioned without assigning the unallocated storage space, the request from the host system can be denied or prevented by the memory sub-system. In another example, after the unassigned storage space, the set of overprovision storage spaces, and the unallocated storage space are reserved for use as part of the buffer memory space, the memory sub-system may receive a request for (creation of) adjust one or more of the overprovision storage spaces (e.g., increase or decrease the overprovision storage spaces) via a command (e.g., FormatNVM). In response to the request to adjust the one or more of the overprovision storage spaces, the request from the host system can be denied or prevented by the memory sub-system. For some embodiments, the unassigned storage space, the set of overprovision storage spaces and the unallocated storage remain reserved until the adjustable buffer memory space feature is disabled.

At operation 710, the processing device (e.g., processor 117) receives, from the host system, a request to disable the adjustable buffer memory space feature. As described herein, via the host system, a user can disable the adjustable buffer memory space feature in order to revert the memory sub-system and the buffer memory space to a traditional configuration.

At operation 712, the processing device (e.g., processor 117) adjusts the buffer memory space to exclude (e.g., remove), from the buffer memory space, the portion of the unassigned storage space and the portion of the set of overprovision storage spaces in response to the request (received by operation 710) to disable the adjustable buffer memory space feature. For some embodiments, disabling the adjustable buffer memory space feature comprises restarting or resetting the memory sub-system to adjust a storage size of the buffer memory space reported to the host system (to account for the exclusion of the unassigned storage space and the set of overprovision storage spaces from the buffer memory space).

Figure 8:
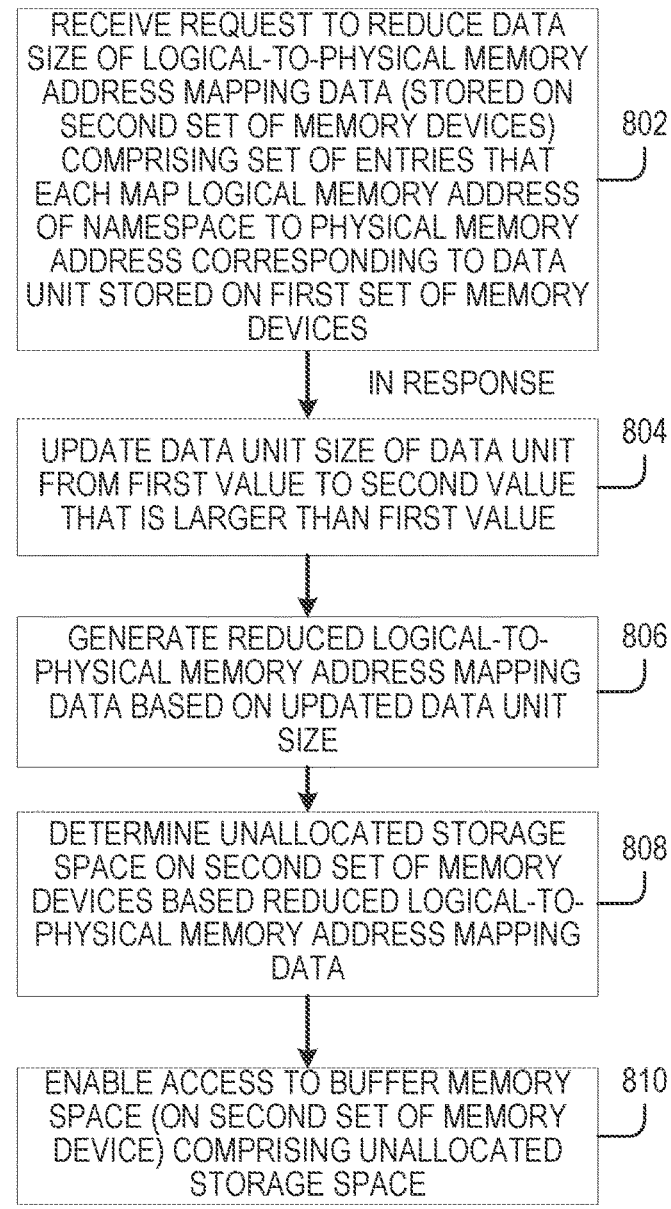

Referring now to the method 800 of FIG. 8, the method 800 relates to changing to a structure (e.g., architecture) of L2P mapping data to reduce the amount of L2P mapping data stored on a memory (e.g., the local memory 119) of a memory sub-system, which can enable buffer memory space accessible by a host system (e.g., the host system 120) to be adjusted (e.g., increased). At operation 802, the processing device (e.g., processor 117) receives a request (e.g., instruction or command) to reduce a data size of logical-to-physical memory address (L2P) mapping data (e.g., L2P table), where the L2P mapping data comprises a set of entries that each map a logical memory address of a namespace to a physical memory address corresponding to a data unit (e.g., indirection unit) stored on a first set of memory devices (e.g., 130, 140) of a memory sub-system, where the data unit has a data unit size (e.g., indirection unit size), and where the L2P mapping data is stored on a second set of memory devices (e.g., the local memory 119) of a memory sub-system. For example, the request can comprise a command from the host system, such as a set command (e.g., NVMe Set Feature command), a vendor specific/unique command (e.g., a vendor specific (VS) command based on an NVMe protocol standard), a vendor specific (VS) bit on an existing command (e.g., NVMe Format NVM command), or a side band command issued to the memory sub-system via a sideband bus interface (e.g., SMBUS) used for various administrative operations of the memory sub-system (e.g., uploading firmware from the host system to the memory sub-system). For some embodiments, the request (e.g., a command) selects from one of multiple options that determine a predetermined data unit size (e.g., indirection unit size). For instance, one option for data unit size can comprise 4K (e.g., 4K byte), another option for data unit size can comprise 6K, another option for data unit size can comprise 8K, and another option for data unit size can comprise 10K.

In response to the request received by operation 802, at operation 804, the processing device (e.g., processor 117) updates the data unit size from a first value to a second value, where the second value is larger than the first value. For example, the first value can comprise 4K (e.g., representing a 4K byte indirection unit size), and the second value can comprise 8K (e.g., representing an 8K byte indirection unit size). The first and second values can vary between different embodiments. For some embodiments, the first value represents a default value, or a manufacturer-set value, for the memory sub-system.

At operation 806, the processing device (e.g., processor 117) generates a reduced-size logical-to-physical memory address mapping data based on the updated data unit size, where the reduced-size logical-to-physical memory address (L2P) mapping data is stored on the second set of memory devices (e.g., the local memory 119). In particular, for various embodiments, the L2P mapping data was generated based on the data unit size being the first value, the reduced-size L2P mapping data is generated based on the data unit size being the second value, and the reduced-size L2P mapping data is smaller in data size than the (prior) L2P mapping data.

At operation 808, the processing device (e.g., processor 117) determines unallocated storage space on the second set of memory devices (e.g., the local memory 119) based on the reduced-size L2P mapping data generated by operation 806. According to various embodiments, the reduction in data size of the L2P mapping data (by operation 806) results in more unallocated storage space on the second set of memory devices than would otherwise exist on the second set of memory devices. Table 2 illustrates examples of how much buffer memory space can be exposed, by a memory sub-system that is using a local memory (e.g., of a memory sub-system controller) to store L2P mapping data, using a 4K indirection unit size and an 8K indirection unit size. As noted in the table, the buffer memory space available assumes 256 MiB of the local memory is used by the miscellaneous/overhead data.

TABLE 2

| Logical Memory Space Capacity of Memory Sub-System (MiB) | Local Memory Density (MiB) | Memory Space Available as Buffer Memory Space (MiB) (with 256 MiB for Misc/Overhead Data) Using 4K Indirection Unit Size | Memory Space Available as Buffer Memory Space (MiB) (with 256 MiB for Misc/Overhead Data) Using 8K Indirection Unit Size |
| --- | --- | --- | --- |
| 400 | 2048 | 1421 | 1608 |
| 480 | 2048 | 1346 | 1570 |
| 800 | 2048 | 1047 | 1421 |
| 960 | 2048 | 898 | 1346 |
| 1600 | 2048 | <299 | 1047 |
| 1920 | 2048 | <1 | 898 |

As shown by Table 2, an 8K data size unit results in a reduced-size L2P mapping data that is smaller in data size than L2P mapping data generated based on a 4K data size unit.

At operation 810, the processing device (e.g., processor 117) enables, for the host system, access to buffer memory space on the second set of memory devices, where the buffer memory space comprises a portion of the unallocated storage space. As described herein, enabling access to the buffer memory space comprises restarting or resetting the memory sub-system to adjust a storage size of the buffer memory space reported to the host system (to account for the inclusion of additional storage space that results from the size reduction of the L2P mapping data by the change in the structure of the L2P mapping data).

Though not illustrated, for some embodiments, using L2P mapping data caching can also be used to reduce the amount of data storage used to store L2P mapping data on the second set of memory devices. According to various embodiments, the reduction in data size of L2P mapping data based on caching L2P mapping data results in (or allows for) additional unallocated data storage (e.g., more data storage space not allocated for storing L2P mapping data) on the second set of memory devices.

Figure 9A:
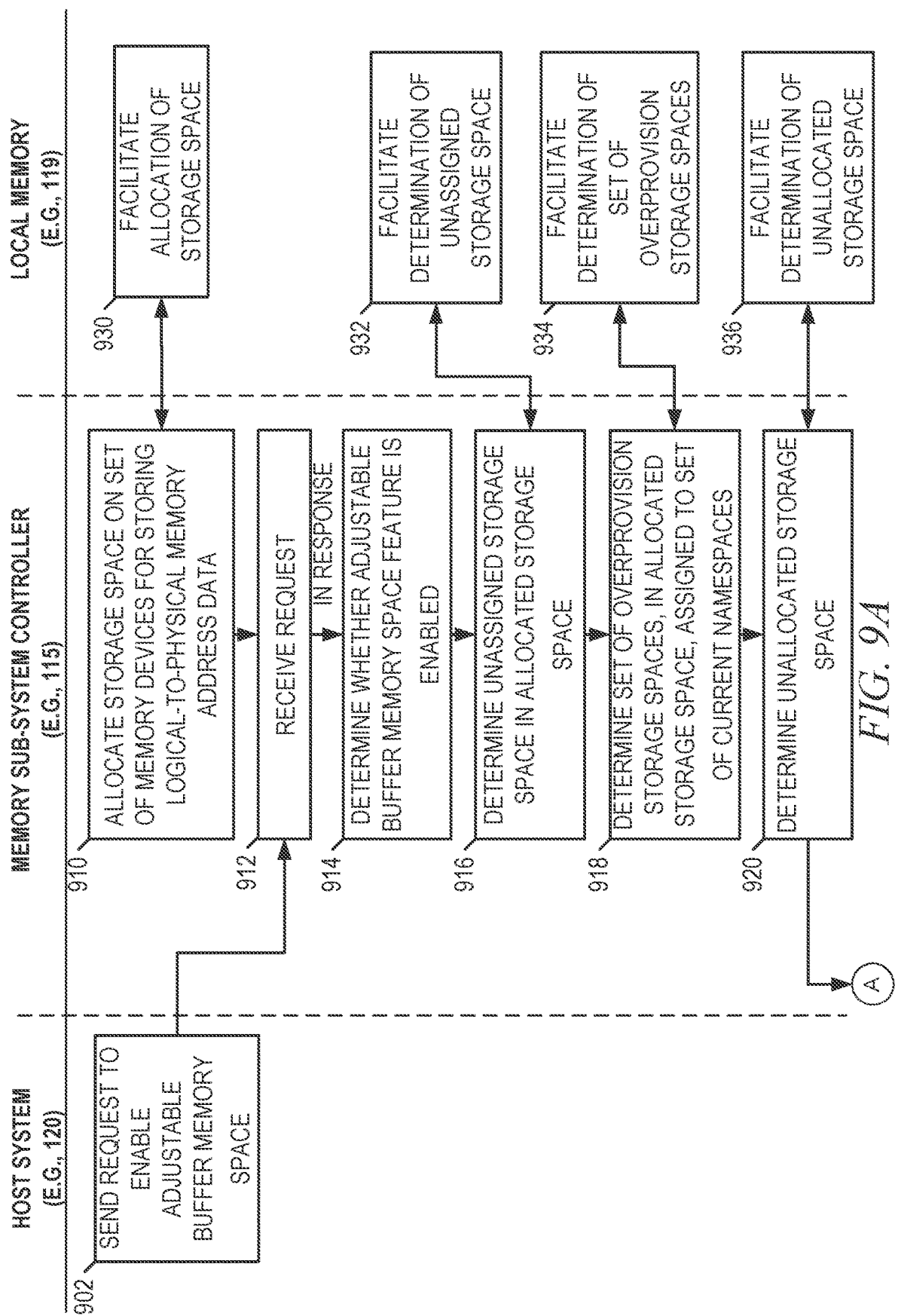

FIGS. 9A and 9B provide an interaction diagram illustrating interactions between components of a computing environment in the context of some embodiments in which a method for adjusting buffer memory space provided by a memory sub-system as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a local memory (e.g., 119), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In the context of the example illustrated in FIGS. 9A and 9B, the host system can include the host system 120, the memory sub-system controller can include the memory sub-system controller 115, and the local memory can include the local memory 119.

As shown in FIG. 9A, at operation 910, the memory sub-system controller 115 allocates storage space (e.g., 212, 312, 412), on a set of memory devices (e.g., the local memory 119) of a memory sub-system, for storing logical-to-physical memory address mapping data that maps a logical memory address of a namespace (having a set of logical memory addresses) to a physical memory address, where physical memory address corresponds to a data storage location on another set of memory devices of the memory sub-system. At operation 902, the host system 120 sends a request to enable the adjustable buffer memory space feature. At operation 930, the local memory 119 facilitates allocation of the data storage space for storing logical-to-physical memory address mapping data.

At operation 912, the memory sub-system controller 115 receives the request. At operation 914, the memory sub-system controller 115 determines whether the adjustable buffer memory space feature is enabled on the memory sub-system. Based on determining that the adjustable buffer memory space feature is enabled, operations 916 through 922 are performed by the memory sub-system controller 115.

At operation 916, the memory sub-system controller 115 determines (e.g., identifies) unassigned storage space (e.g., 250, 450) in the allocated storage space (allocated by operation 910 for storing logical-to-physical memory address mapping data). At operation 932, the local memory 119 facilitates determination of the unassigned storage space. At operation 918, the memory sub-system controller 115 determines (e.g., identifies) a set of overprovision storage spaces (e.g., 372, 472), in the allocated storage space, assigned to a set of current namespaces (e.g., 370, 470). At operation 934, the local memory 119 facilitates determination of the set of overprovision storage spaces. At operation 920, the memory sub-system controller 115 determines (e.g., identifies) unallocated storage space on the set of memory devices. At operation 936, the local memory 119 facilitates determination of the unallocated storage space.

Referring now to FIG. 9B, at operation 922, the memory sub-system controller 115 enables, for a host system coupled to the memory sub-system, access to buffer memory space on the set of memory devices, where the buffer memory space comprises a portion (e.g., some or all) of the unallocated storage space determined by operation 920, a portion (e.g., some or all) of the unassigned storage space determined by operation 916, and a portion (e.g., some or all) of the set of overprovision storage spaces determined by operation 918. At operation 904, the host system 120 receives (from the memory sub-system 110) access to the buffer memory space enabled on the local memory 119 of the memory sub-system 110.

Figure 10:
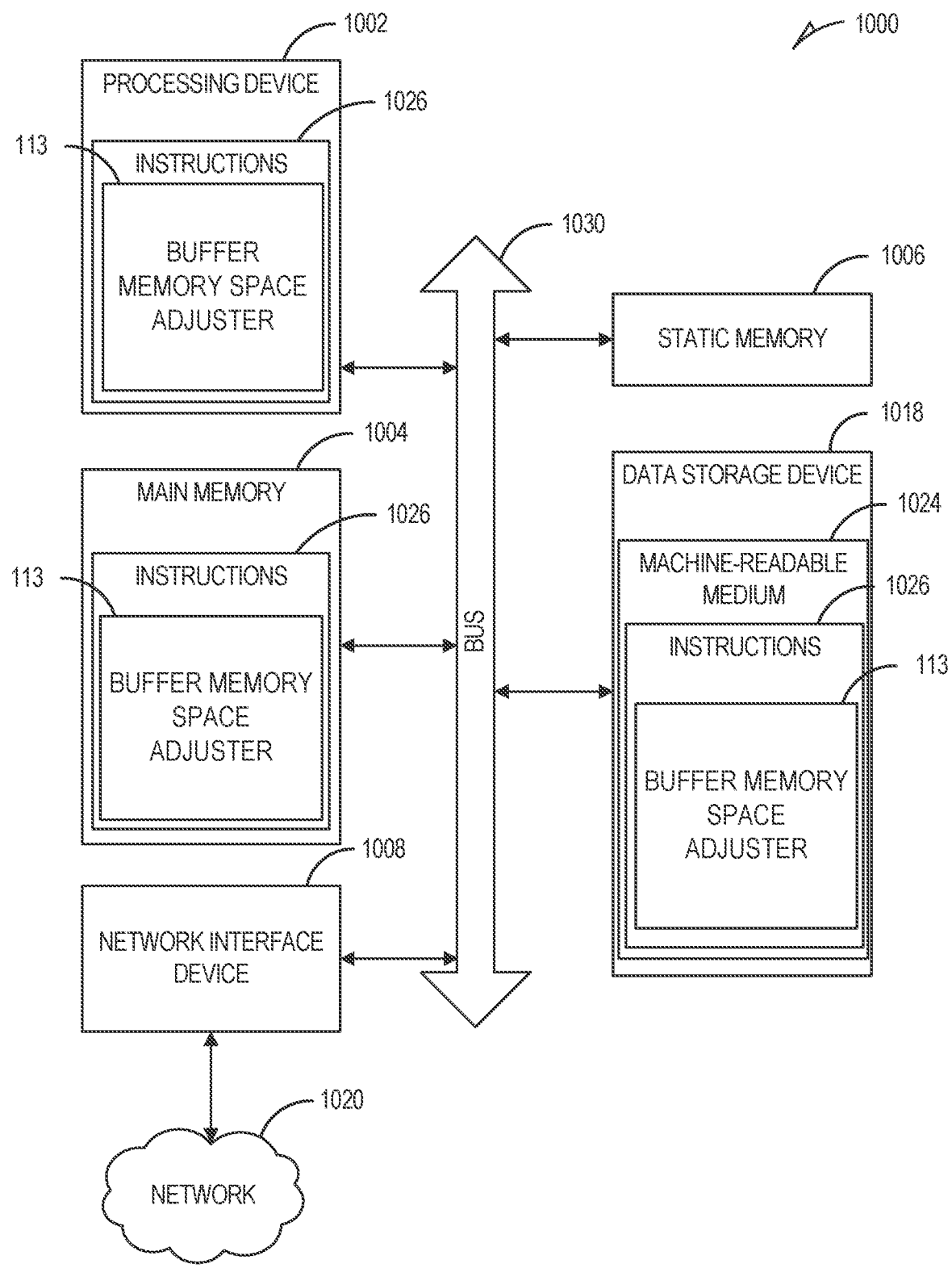
FIG. 10 is a block diagram of an example computer system in which embodiments of the present disclosure may operate.

FIG. 10 illustrates an example machine in the form of a computer system 1000 within which a set of instructions can be executed for causing the machine to perform any one or more of the methodologies discussed herein. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

The processing device 1002 represents one or more general-purpose processing devices such as a microprocessor, a central processing unit, or the like. More particularly, the processing device 1002 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1002 can also be one or more special-purpose processing devices such as an application specific integrated circuit (ASIC), a field programmable gate array (FPGA), a digital signal processor (DSP), a network processor, or the like. The processing device 1002 is configured to execute instructions 1026 for performing the operations and steps discussed herein. The computer system 1000 can further include a network interface device 1008 to communicate over a network 1020.

The data storage device 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage device 1018, and/or main memory 1004 can correspond to the memory sub-system 110 of FIG. 1.

In one embodiment, the instructions 1026 include instructions to implement functionality corresponding to adjusting buffer memory space provided by a memory sub-system as described herein (e.g., the buffer memory space adjuster 113 of FIG. 1). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a first set of memory devices;
a second set of memory devices; and
a processing device, operatively coupled to the first and the second sets of memory devices, configured to perform operations comprising:
  allocating storage space on the second set of memory devices for storing logical-to-physical memory address mapping data; and
  based on determining that an adjustable buffer memory space feature is enabled:
    determining a set of overprovision storage spaces in the allocated storage space, the set of overprovision storage spaces being assigned to a set of current namespaces, an overprovision storage space of a current namespace being associated with storage of logical-to-physical memory address mapping data that maps a set of logical memory addresses of the current namespace to a set of physical memory addresses corresponding to a set of data storage locations on the first set of memory devices, and the set of data storage locations being reserved on the system as overprovisioned;
    determining unallocated storage space on the second set of memory devices; and
    enabling, for a host system, access to buffer memory space on the second set of memory devices, the buffer memory space comprising a portion of the unallocated storage space and a portion of the set of overprovision storage spaces.

2. The system of claim 1, wherein the enabling of access to the buffer memory space comprises restarting or resetting the system to adjust a storage size of the buffer memory space reported to the host system.

3. The system of claim 1, wherein access to the buffer memory space comprises access to the buffer memory space via a Base Address Register (BAR) space in accordance with a Peripheral Component Interconnect Express (PCIe) standard.

4. The system of claim 1, wherein after the enabling access to the buffer memory space, the set of overprovision storage spaces is reserved for use as part of the buffer memory space.

5. The system of claim 1, wherein the operations comprise:
prior to the determining whether the adjustable buffer memory space feature is enabled on the system, receiving, from the host system, a request to enable the adjustable buffer memory space feature.

6. The system of claim 1, wherein the operations comprise:
receiving, from the host system, a request to disable the adjustable buffer memory space feature; and
in response to the request to disable the adjustable buffer memory space feature, adjusting the buffer memory space to exclude, from the buffer memory space, the portion of the set of overprovision storage spaces.

7. The system of claim 1, wherein the operations comprise:
based on determining that the adjustable buffer memory space feature is enabled:
determining unassigned storage space in the allocated storage space, the buffer memory space further comprising a portion of the unassigned storage space.

8. The system of claim 7, wherein after the enabling access to the buffer memory space, the unassigned storage space and the unallocated storage space are reserved for use as part of the buffer memory space.

9. The system of claim 7, wherein the operations comprise:
receiving, from the host system, a request to disable the adjustable buffer memory space feature; and
in response to the request to disable the adjustable buffer memory space feature, adjusting the buffer memory space to exclude, from the buffer memory space, the portion of the set of overprovision storage spaces and the portion of the unallocated storage space.

10. A method comprising:
determining, by a memory controller of a memory sub-system, whether an adjustable buffer memory space feature is enabled on the memory sub-system, the memory sub-system comprises a first set of memory devices and a second set of memory devices, the second set of memory devices comprising allocated storage space, the allocated storage space for storing logical-to-physical memory address mapping data that maps a logical memory address of a namespace to a physical memory address corresponding to a data storage location on the first set of memory devices; and
based on determining that the adjustable buffer memory space feature is enabled:
determining, by the memory controller, a set of overprovision storage spaces in the allocated storage space, the set of overprovision storage spaces being assigned to a set of current namespaces, a overprovision storage space of a current namespace being associated with storage of logical-to-physical memory address mapping data that maps a set of logical memory addresses of the current namespace to a set of physical memory addresses corresponding to a set of data storage locations on the first set of memory device, and the set of data storage locations being reserved on the memory sub-system as overprovisioned;
determining unallocated storage space on the second set of memory devices; and
enabling, for a host system coupled to the memory sub-system, access to buffer memory space on the second set of memory devices, the buffer memory space comprising a portion of the unallocated storage space and a portion of the set of overprovision storage spaces.

11. The method of claim 10, wherein the enabling of access to the buffer memory space comprises restarting or resetting the system to adjust a storage size of the buffer memory space reported to the host system.

12. The method of claim 10, wherein access to the buffer memory space comprises access to the buffer memory space via a Base Address Register (BAR) space in accordance with a Peripheral Component Interconnect Express (PCIe) standard.

13. The method of claim 10, wherein after the enabling access to the buffer memory space, the set of overprovision storage spaces is reserved for use as part of the buffer memory space.

14. The method of claim 10, further comprising:
prior to the determining whether the adjustable buffer memory space feature is enabled on the memory sub-system, receiving, from the host system, a request to enable the adjustable buffer memory space feature.

15. The method of claim 10, further comprising:
receiving, from the host system, a request to disable the adjustable buffer memory space feature; and
in response to the request to disable the adjustable buffer memory space feature, adjusting the buffer memory space to exclude, from the buffer memory space, the portion of the set of overprovision storage spaces.

16. The method of claim 10, further comprising:
based on determining that the adjustable buffer memory space feature is enabled:
determining unassigned storage space in the allocated storage space, the buffer memory space further comprising a portion of the unassigned storage space.

17. The method of claim 16, wherein after the enabling of access to the buffer memory space, the unassigned storage space and the unallocated storage space are reserved for use as part of the buffer memory space.

18. The method of claim 16, further comprising:
receiving, from the host system, a request to disable the adjustable buffer memory space feature; and
in response to the request to disable the adjustable buffer memory space feature, adjusting the buffer memory space to exclude, from the buffer memory space, the portion of the set of overprovision storage spaces and the portion of the unallocated storage space.

19. A non-transitory computer-readable storage medium comprising instructions that, when executed by a processing device, cause the processing device to perform operations comprising:
determining, by a memory controller of a memory sub-system, whether an adjustable buffer memory space feature is enabled on the memory sub-system, the memory sub-system comprises a first set of memory devices and a second set of memory devices, the second set of memory devices comprising allocated storage space, the allocated storage space for storing logical-to-physical memory address mapping data that maps a logical memory address of a namespace to a physical memory address corresponding to a data storage location on the first set of memory devices; and
based on determining that the adjustable buffer memory space feature is enabled:
determining, by the memory controller, a set of overprovision storage spaces in the allocated storage space, the set of overprovision storage spaces being assigned to a set of current namespaces, a overprovision storage space of a current namespace being associated with storage of logical-to-physical memory address mapping data that maps a set of logical memory addresses of the current namespace to a set of physical memory addresses corresponding to a set of data storage locations on the first set of memory device, and the set of data storage locations being reserved on the memory sub-system as over-provisioned;

determining unallocated storage space on the second set of memory devices; and enabling, for a host system coupled to the memory sub-system, access to buffer memory space on the second set of memory devices, the buffer memory space comprising a portion of the unallocated storage space and a portion of the set of overprovision storage spaces.

20. The non-transitory computer-readable storage medium of claim 19, wherein the enabling of access to the buffer memory space comprises restarting or resetting the system to adjust a storage size of the buffer memory space reported to the host system.

\* \* \* \* \*